United States Patent
Bellora

(10) Patent No.: US 10,663,297 B2
(45) Date of Patent: *May 26, 2020

(54) STAR NAVIGATION TOOL AND SYSTEM

(71) Applicant: John Bellora, San Diego, CA (US)

(72) Inventor: John Bellora, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,398

(22) Filed: Jun. 11, 2019

(65) Prior Publication Data

US 2019/0293427 A1  Sep. 26, 2019

Related U.S. Application Data

(63) Continuation of application No. 15/465,534, filed on Mar. 21, 2017, now Pat. No. 10,317,213.

(60) Provisional application No. 62/311,144, filed on Mar. 21, 2016.

(51) Int. Cl.
| | | |
|---|---|---|
| *G01C 21/02* | (2006.01) | |
| *G06G 1/08* | (2006.01) | |
| *G09B 27/04* | (2006.01) | |
| *G06G 1/00* | (2006.01) | |

(52) U.S. Cl.
CPC .......... *G01C 21/02* (2013.01); *G06G 1/0052* (2013.01); *G06G 1/08* (2013.01); *G09B 27/04* (2013.01)

(58) Field of Classification Search
CPC .......... G01C 21/02; G06G 1/08; G09B 27/04
USPC .......................................................... 33/228
See application file for complete search history.

(56) References Cited

U.S. PATENT DOCUMENTS

| | | | | |
|---|---|---|---|---|
| 2,478,981 A | * | 8/1949 | Randall, Jr. ............ | G01C 21/02 235/78 N |
| 2,495,211 A | * | 1/1950 | Curtis ..................... | G01C 21/02 33/1 SD |
| 3,109,588 A | * | 11/1963 | Polhemus ............. | G06G 1/0052 235/61 NV |
| 3,360,196 A | * | 12/1967 | Grega .................... | G09B 27/04 235/88 R |
| 3,673,710 A | * | 7/1972 | Eisenhauer ............ | G09B 27/04 434/285 |
| 3,858,334 A | * | 1/1975 | Eisenhauer ............ | G01C 21/02 434/285 |
| 4,012,851 A | * | 3/1977 | Eisenhauer ............ | G01C 21/02 434/285 |
| 4,083,121 A | * | 4/1978 | Eisenhauer ............ | G01C 21/02 434/111 |

(Continued)

*Primary Examiner* — Yaritza Guadalupe-McCall
(74) *Attorney, Agent, or Firm* — Michael L. Greenberg, Esq.; Greenberg & Lieberman, LLC

(57) ABSTRACT

A system of navigation employing an emergency longitude slide ruler for stellar navigation is described. The emergency longitude slide ruler is equipped with several wheels having rulers with settings including of the longitude slide ruler of the present invention include year, date, hour, minutes, star angle measurement degree wheel, a longitude wheel, a circumpolar star field identifier wheel, star meridian transit angles wheel, and a time zone wheel. All wheels are of diminishing diameters and are laid on top of each other in descending circumference with minute gradations allowing each consecutive wheel to line up with its larger adjacent wheel according to proper settings to eventually indicate longitude. The system presents an efficient and expedient means by which an individual with very limited knowledge of navigation and celestial bodies can determine his or her location, including longitude.

3 Claims, 8 Drawing Sheets

(56) References Cited

U.S. PATENT DOCUMENTS

| | | | | |
|---|---|---|---|---|
| 4,134,006 | A * | 1/1979 | Gordon | G01C 21/20 |
| | | | | 235/61 NV |
| 4,491,724 | A * | 1/1985 | Murray | G06G 1/08 |
| | | | | 235/61 NV |
| 7,685,722 | B1 * | 3/2010 | Spire, Jr. | G01C 21/02 |
| | | | | 33/270 |
| 10,317,213 | B2 * | 6/2019 | Bellora | G01C 21/02 |
| 2010/0219254 | A1 * | 9/2010 | Fry | G06G 1/0052 |
| | | | | 235/78 N |
| 2017/0268882 | A1 * | 9/2017 | Bellora | G01C 21/02 |
| 2018/0238690 | A1 * | 8/2018 | Laine | G06K 9/00664 |

\* cited by examiner

STAR NAVIGATION TOOL AND SYSTEM

CONTINUITY

This application is a continuation application of non-provisional patent application Ser. No. 15/465,534, filed on Mar. 21, 2017, and of Provisional Patent Application No. 62/311,144, filed on Mar. 21, 2016, and priority is claimed thereto.

FIELD OF THE PRESENT INVENTION

The present invention relates to navigational tools, and more specifically relates to a tool and system configured to facilitate the navigation of an individual in emergency situations via the position of the stars in relation to one another, as opposed to standard Celestial Navigation which uses the relation between stars and the horizon. The new system is simplified and expedited through the use of an emergency longitude slide ruler utilizing only the Circumpolar region of the sky.

BACKGROUND OF THE PRESENT INVENTION

Conventionally, vessels such as boats, yachts, and ships are equipped with navigational equipment configured to enable the captain to navigate the seas accurately and quickly. These devices include a Loran Navigational System and a Global Positioning System (GPS) configured to triangulate a position with two or more space satellites. Many automotive vehicles, phones and aircraft are also now equipped with navigational tools, such as a Global Positioning System (GPS).

Unfortunately, each of these conventional devices requires electricity to function. In the event of a battery failure, electrical failure, loss of signal, or other technical issue, individuals can quickly lose their bearings. This remains especially true during storms, high humidity or severe dry static prone spells day or night, one lightning strike to the mast of an ocean vessel can destroy all electronic navigation equipment on board. The latest recognized threat by the United States Navy admits its fears of cyber hacking of the navigation system and the GPS and thus considering reviving old traditional methods.

In the unfortunate event of an accident or similar unfortunate circumstances, individuals can be left without a navigator or the modern day conventional electronic navigation equipment. A fast, easy, and accurate method to navigate by that anyone onboard the vessel could understand and use would be invaluable in such a scenario. Such a method could preferably be learned in just a few minutes and performed gaining a fixed location in even less time. Standard Celestial Navigation is fast becoming a lost art. Few schools and organizations even teach it anymore. The United States Navy has dropped the requirements from their curriculum in 1998. Yacht clubs only teach celestial Navigation as a novelty but most don't bother anymore due to the lack of need or interest. The few people that take the time and expense to learn the skills required to practice celestial navigation and the ones that do often forget the skill due to a lack of use.

GPS and other electronic devices fail, Satellites fail, and batteries fail, often due to natural electromagnetic interference, cyber hacking, lightning strike, wet equipment, poor weather, accidental or purposeful interference (such as a pulse bomb or EMP which can render all GPS and other electronic devices inoperable). In an emergency, a simple and fast manual approach is needed to determine longitude without the complex education in standard celestial navigation conventionally required a set of yearly government publications of charts and tables, skills interpreting those tables, error correction sheets and a knowledge and system of how to identifying a visible star when only a few or one is visible, geometry calculations, Soft or no horizon visibility or electronics and the use and knowledge of a sextant. It is rather complex.

A primary disadvantage of standard celestial navigation is that all measurements must be taken from the horizon. As such, "Celestial Navigation" though reasonably accurate when conditions allow, may have been more appropriately named "Terrestrial Navigation", as measurements are based off of angles from the Earthly horizon. The horizon is the heart and soul of celestial navigation. There are many problems that can occur when using the horizon for navigation, including a lack of visibility due to land, cloud banks, atmospheric refraction, low lying haze, lack of moonlight, a phenomenon called "Soft horizon," ocean mirages, and other horizon distortions. All these detrimental conditions occur more often on the horizon.

In addition the process may require as much as 20 corrections for each star needed as one works through work sheets. A few other very important corrections to standard Celestial navigation are the need for Dip and sextant corrections. The Dip correction takes in account the distance the observer is above the water which is imperative and requires tables or a trigonometry to correct. This is very important and can give the navigator errors of hundreds of miles depending on if one is in a life raft, giant cargo ship or an aircraft. With Stellar Navigation, this is not necessary since the horizon is not utilized in determining Longitude, and no work sheets are required for basic operation.

Celestial navigation requires very intensive training and education, extensive error correcting work sheets, possession and the knowledge of deciphering the multiple government publications with the tables of stars locations (GP) for every second of the year, and an education on how to interpret those tables, along with an apparatus or publication on locating and identify the stars by name. Without identifying the name of a visible star to measure, one cannot search the multiple publications for the position of that star at that date and time. The problem with standard celestial navigation method is the tunnel vision into the tables, charts and work sheets leaving you void of the big picture. With Stellar Navigation, one can literally look into the sky and eye-ball his or her approximate location when using a GMT/UTC time piece.

Additionally, in the event that one cannot see the horizon, which is common at sea and especially in an aircraft, one is lost if using celestial navigation alone to navigate. At aircraft altitudes, the horizon is farther from the observer, and is therefore much more difficult to view through haze. Celestial navigation does not provide a means using stars to derive longitude without a sharp unobstructed horizon. Many things can prevent one from seeing the horizon, such as distant cloud banks, interrupted horizon from land masses, inadequate light at night and the phenomenon called a "Soft Horizon." Soft Horizon is caused by light refraction of different density air layers. Even if one can see what appears to be a sharp horizon, it may not be true. The phenomenon is very common on highways, deserts and the ocean, created by large temperature differences across a span of water or land. This causes a mirage effect, making highways or deserts look as though there is lake with water ahead, or buildings and vehicles suspended in mid air. On the sea, this creates either a soft horizon not distinguishable from the sky, or simply shows what appears to be the horizon several degrees below or above the true horizon and can mask very large objects such as icebergs, cargo ships and even complete land masses.

In fact, the light is reflecting off a layer of air right above the surface that is different in temperature than the layer above it creating a mirror, reflections of distant objects just as if it is a reflection off a mirror lying flat, or water. Light traveling through two different layers of air with different densities due to different temperatures will diffract at different angles creating distortions and a mirror effect and show reflections of distant features like mountains and stars near the horizon, making the area below the true horizon full of stars fooling the navigator in thinking the horizon must be much lower. This phenomenon causes distant ships to appear triple the height in some cases, or huge tall cargo ships to look like flat oil rigs in other cases. Sometimes, islands with beaches will appear to be stretched upward and to be surrounded by a great cliff. The Invisibility effect is the most interesting, and is not limited just to locations close to the Horizon. As the two distinct density layers of air are diffracting light differently, a blind spot is created where an entire ship can be sitting on the horizon, and yet the ship simply is not visible depending on the temperature of the water compared to the air. With enough distance from the hot and cold layer diffracting light at two different angles, the spread over many miles can be significant enough to hide even mountains that are on land masses on the horizon such as islands and are most prevalent in the desert and oceans. This is actually common at sea when ships in the open sea steam towards cold or warm ocean currents as an example of traveling west across the moderately warm northern Atlantic and then crossing the south flowing ice cold Labrador Current carrying icebergs. This is will assuredly cause severe mirage and mirror effects year round. Thus, these are some of the hazards of relying only on the horizon for navigation.

Alas, there is a need for a new navigation system and method that enables a beginner, novice or master navigator to quickly and easily to determine the longitude and latitude of his position without need for reference of the horizon, nor need for extensive training in celestial navigation to employ the stars for basic navigation.

Modern Celestial Navigation though quite effective in the hands of a master, requires such an expert to accurately gain a location fix. Without knowing the name of that star, the navigator is lost with celestial navigation alone.

Conversely, Stellar navigation of the present invention uses a known single reference position from published NASA data associated with a specific date and time which is easily converted to present time and date by the diurnal action of the stars in the circumpolar region of the sky. This is similar to recognizing that the 12:00 position of a clock is strait up at the top of the dial without the presence of numbers. The stars rotate like the hour hands of a clock rotating around a single point. This motion is called the diurnal motion and the area where the stars rotate in a full circle like the hour hands of a clock face, unobstructed by dipping below the horizon during a full 360 degree rotation is the called the circumpolar region of the sky, this is our clock face and we call the sky clock. It can be used to tell accurate time, date and longitude and what the stars position will be at any date and time within the Common Era past, present and future. The Emergency Longitude Slide Ruler takes full advantage of this with precision.

SUMMARY OF THE PRESENT INVENTION

The present invention is a stellar navigation method and system configured to greatly simplify the navigation process, while eliminating the possibility of errors twenty-fold compared to conventionally taught celestial navigation when using stars. The method and system of the present invention employs the use of a slide ruler called the Emergency Longitude slide ruler, which can be fitted with any emergency lifeboat kit, aircraft or back pack for the world traveler, accompanied by simple quick instructions for use and a bubble level protractor, goniometer, or inclinometer. The Emergency Longitude Slide Ruler of the present invention does not use the horizon for latitude or longitude calculations and is not subject to issues from horizon distortions, a lack of moon light, and cloud banks on the horizon. In addition the method and slide ruler shows what the current star positions will be at that specific date and time, allowing the user to use any star in the circumpolar region of the sky for navigation without knowing its name simply by recognizing it on the circumpolar star field plate (30).

The purpose of the present invention is to provide a fast, simple and very accurate no-nonsense manual device for the purpose of navigating land, air, and sea for a person with little or no experience in celestial navigation and its corresponding error correction work sheets, government required publications of tables or the luxury of working electronic navigation equipment. The process of the present invention is easy to use and learn. The Emergency Longitude Slide Ruler of the present invention requires only five minutes of instruction to learn how to use and even less time to determine a longitude fix as opposed to an 8 week 16 hour required for a typical course in conventional celestial navigation.

Where conventional celestial navigation and stellar navigation of the present invention differ is what the stars' positions are disposed in reference to, and the predetermined reference positions of the stars method. Celestial navigation uses the angle of at least three stars against the horizon. Stellar Navigation on the other hand, uses the single star's angle to another star or in some cases a single star to obtain a fix of position.

The present invention's Stellar Navigation is a result of looking at the problem of longitude as an engineering argument, as opposed to a navigation problem. Stellar Navigation and the Emergency Longitude slide ruler is not meant to replace Celestial navigation, but rather can be used instead of, or as verification to, Celestial navigation.

Celestial navigation has had many centuries of critiquing, and is presently being enhanced with the aide and use of massive computer-generated tables published yearly by the Government and the error-correcting worksheets has become a reasonably accurate process capable of a three mile diameter location fix in the hands of a seasoned master. The primary problem with celestial navigation is, as stated before, the extensive education, experience and practice required of a navigator to be trained to be adept, and all of the aforementioned requirements. This includes a separate education in locating and memorizing stars names and the education on deciphering the government publications of tables. The whole process must be repeated three times to gain an accurate fix. Even after one course in celestial navigation, many will still find themselves hopelessly lost and confused in the Bermuda triangle, or other dead zones. Very few people these days even try to master the art of celestial navigation for this reason. Even the Coast Guard and Navy have dropped the requirement for celestial navigation.

The present method Stellar Navigation invention is configured to enable one to easily look into the sky to determine approximate Longitude and Latitude simply by eyeballing star position, and knowing GMT/UTC by means of a time piece. Now when utilizing an inclinometer, goniometer, or protractor device, the user then can achieve 10 times the accuracy. Now, utilize the longitude slide ruler with the angle measuring device, and then user can achieve 10 times the accuracy yet again. The accuracy of the rulers is without flaw but limitations to the size prevent the graduates of the rulers from being small enough to match the government charts and tables but with careful angle measurements a location fix of six mile diameter is conceivable for a novice. The Emergency Longitude slide ruler of the present invention also compensates for the yearly deviation eliminating the need for separate yearly publications required for modern day celestial navigation.

Benefits of Stellar Navigation process and method of the present invention include:

- Emergency Longitude slide ruler also compensates for the yearly deviation and leap year, eliminating the need for separate yearly publications required for modern day celestial navigation.
- No need to memorize any star's name or identify any star (this is absolutely essential for celestial navigation because one must identify a star by name, and then search the publications and tables with that particular star name for relevant data. Then decipher the tables.) This process generally has to be done for three different stars in order to get a fix on position with standard celestial navigation.
- One may simply look to the north (for the northern hemisphere version) and match by site to the circumpolar plate (30) or accurate angle measurement the pattern one sees to the Circumpolar star field wheel (30) of the present invention and then choose the best star to get an angle measurement. The same applies to the southern hemisphere version of the present invention.
- No Dip correction is needed (angle above the earth surface measurement is taken from and is paramount in conventional celestial navigation).
- No IC corrections are needed. (The protractor or inclinometer used is infinitely less complicated and less prone to errors than a sextant and can be supplied with the Emergency Longitude Slide Ruler. At a minimal cost.
- No Horizon reference points are needed.
- Only one star measurement is needed to determine longitude.
- Sextant is not needed but can be used for some latitude and longitude determinations instead of using an astrolabe or inclinometer. An inclinometer, goniometer, or a protractor fitted with a leveling bubble is used instead for longitude and an astrolabe for latitude and longitude in some cases, a far more simplistic and inexpensive tool.
- The system of the present invention can be taught in 5 to 10 minutes.
- Longitude can be achieved in merely as little as two minutes.
- No work error correction sheets are needed.
- No yearly government publications needed to maintain use of the present invention, unlike with celestial navigation.
- No need to find GHA.
- No need to find the GP of the stars.
- No need to calculate a Celestial Triangle.
- No Atmospheric Refraction corrections necessary since a navigator can choose any star in the higher altitudes of the circumpolar region, which is almost completely void of this distortion due to the high altitude angle.

Additionally, the emergency longitude slide ruler of the present invention can also be used without a measuring device if need be for a quick approximation. Simply by eye-balling the observed star positions, and adjusting the Circumpolar star field wheel of the present invention as to correlate to what one presently views in the sky, one can quickly calculate within a few degrees of true longitude. The year setting, date and time wheels of the slide ruler of the present invention need to be set as well, in order for the present invention to function correctly.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
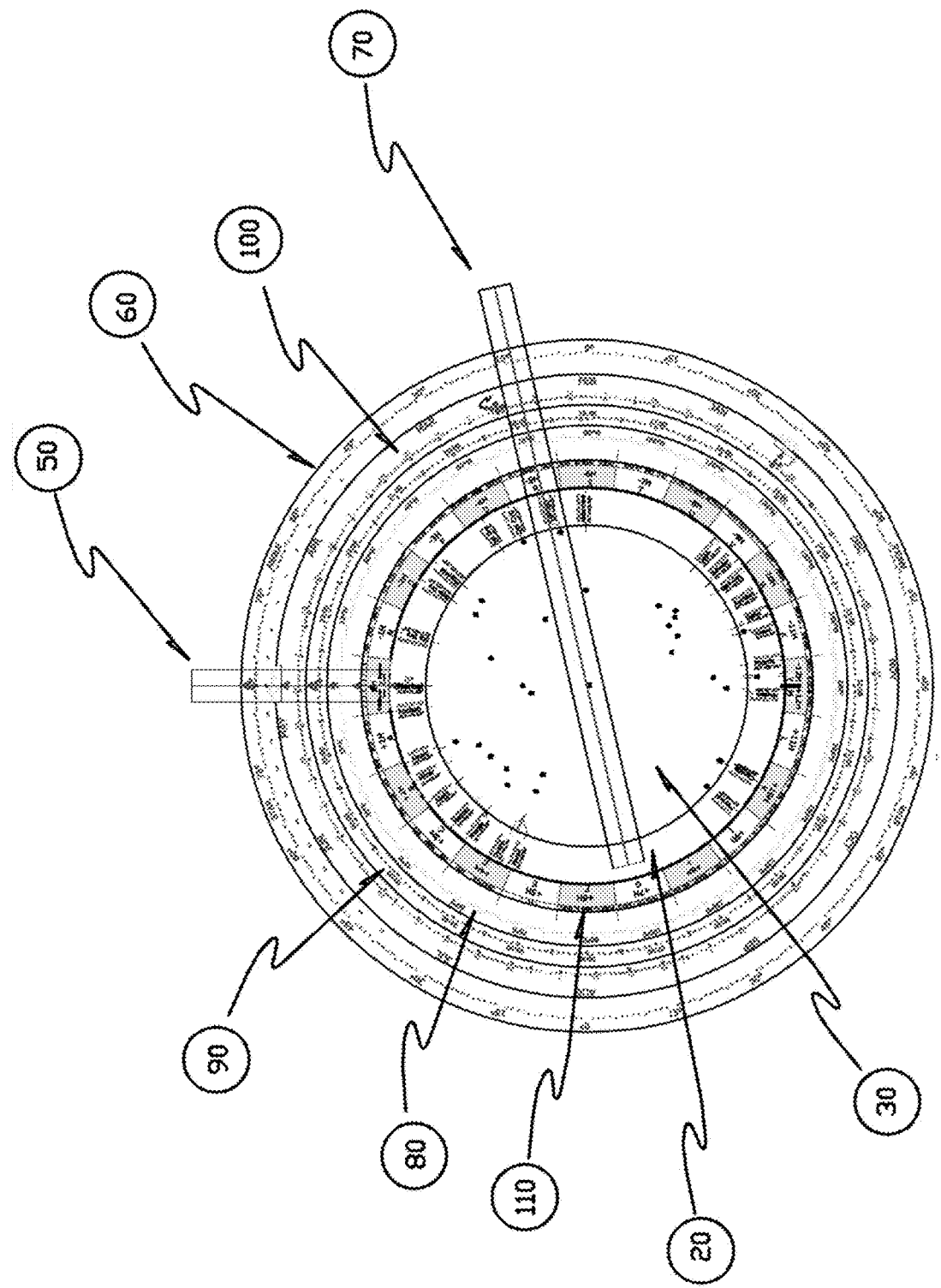
FIG. 1 displays a schematic view of the primary embodiment of the longitude slide ruler portion of the present invention, showing the front of the present invention.

The present invention is an emergency longitude slide ruler and method of use. The emergency longitude slide ruler is a precision instrument which compares one's current observed star position in the average circumpolar region of the sky to that of the star positions along the 0° meridian (Prime meridian) at that moment in time. The computed difference leads to the local longitude figure. The present invention uses a known reference star position determined by NASA astronomical tables at a given year, date and time as the zeroing base. From this, and correlating particular positioning of the wheels (10) of the present invention, all other information is attained. In the Northern hemisphere version of the present invention, the angle refers to something measurable to be relevant. As a default, the process of use of the present invention uses the star Polaris to Pherkad angle with respect to the earth geoid surface or center of gravity. Any star could be selected to measure the angle to Polaris based on current visibility but, Pherkad fits the requisite criteria quite well compared to the others in the Northern hemisphere as the standard default pair when visibility is good. When visibility is not favorable then there are a minimum of 4 more methods to choose from which are as easy to obtain longitude.

The present invention employs a circular slide ruler consisting of ten wheels (10) containing different information that interact with each other, and three transparent angle arms including a primary angle arm (50), a secondary angle arm (70), and a third angle arm (150). Some of the wheels (10) are combined, and do not operate independently, but rather add additional information to the primary wheel of the pair.

Some of the wheels (10) of the longitude slide ruler of the present invention are stationary, some are free floating, and some are attached to other wheels, as well as in communication with the three transparent angle arms. All wheels (10) are of diminishing diameters and are laid on top of each other in descending circumference with minute gradations allowing each consecutive wheel (10) to line up with its larger neighbor according to proper settings to eventually indicate longitude. Settings for each of the wheels (10) of the longitude slide ruler of the present invention include year, date, hour, minutes, star angle measurement degree wheel, a longitude wheel, a circumpolar star field identifier wheel, star meridian transit angles wheel, and a time zone wheel. The details of each of the wheels (10) of the present invention include:

On the front side:

1.) The present invention is equipped with a degrees wheel (60) for angles between stars. The degrees wheel (60) remains stationary, and uses the primary angle arm (50) to set at the measured star position when using Pherkad and Polaris as the default stars.

2.) The present invention has a date wheel (100), consisting demarcations of days and hours, which rotates to the proper year.

3.) The present invention has a time wheel (90), demarcated with gradations for hours and minutes, which rotates to a proper UTC date and hour setting.

4.) Longitude wheel (80) which consist of degrees and fractions of a degree and rotates to a proper UTC hour and min setting. Is also affixed to the Time Zone wheel (110)

5.) The present invention is outfitted with a time zone wheel (110) which is affixed to the longitude wheel (80), and indicates which time zone and longitude he or she is in when the primary transparent angle arm (50) is positioned. The most prominent locations in each time zone are also displayed on the time zone wheel (110) for reference.

6.) The present invention has a star meridian transit angle wheel (20) which is affixed to the circumpolar star field plate and provides star names to identify stars in the circumpolar star field plate and the angles of each star's angular position away from the reference default of Pherkad within the circumpolar region. This wheel is used for Single star offset method; Special pair offset method and the Transit methods to determine Longitude.

7.) The present invention is equipped with a circumpolar star field plate (30), which displays an exact representation of the most prominent stars in the center 90 degrees (90 at the celestial pole down to 45 degrees, which displays a 90 degree arc circumpolar region) or circumpolar region of the sky. The stars are overlaid on an altitude and Azimuth grid. Also having graduates demarcated on the circumpolar star field plate (30). With respect to star's azimuth away from Pherkad. Accuracy of the positions of the stars within the circumpolar star field grid is based on NASA astronomical tables and is paramount to the accuracy of the device.

8.) The present invention is equipped with a primary transparent angle arm (50) affixed to the circumpolar star field plate. And is set to the measured angle between the chosen stars on the degrees wheel (60).

9.) The present invention additionally has a secondary transparent angle arm (70). To be used for the Special star pair method when Polaris is not visible and to be used in the Transit method.

The reverse side of the longitude slide ruler of the present invention is equipped with the following:

10.) The present invention is equipped with a stationary star multiplier wheel (130) for aiding the determination of latitude from the angle of certain Special star pair method when Polaris the pole star is not being utilized. The stationary star multiplier wheel (130) is disposed on the back of the emergency Longitude slide ruler.

11.) The present invention has a stationary Polaris correction wheel (140) for aiding in precision latitude when the pole star Polaris is used to determine latitude, as Polaris is offset from the exact pole by about 0.66 degrees and is used to compensated for when precise latitude is desired. The stationary Polaris correction wheel (140) is disposed on the back of the emergency longitude slide ruler.

12.) Stationary secondary degrees angle wheel (40) ruler for star altitude to be used with the astrolabe located on the back of the emergency longitude slide ruler.

13.) Has a third transparent angle arm for use of the astrolabe which also aids in star altitude measurements as well as the #10 and #11 points above.

Options for usable stars with the present invention are available on the circumpolar star field plate (30), and are also available from 90 degrees down to 0 degrees latitude (equator). A 180° diameter wide circumpolar plate is available, which displays a 180 degree arc circumpolar region, as well as with more extensive star selection.

The longitude slide ruler of the present invention has a Northern Hemisphere version and a Southern Hemisphere version. The Southern Hemisphere version is a distinctly different device in that all of the information on the wheels is inversed in comparison to the Northern Hemisphere version, and of course the star field plate (30) consists of an exact representation of the stars in the Southern Hemisphere, rather than those in the Northern Hemisphere. The reason all the information in the Southern Hemisphere version is reversed, is because a person at the North Pole will see all the stars in the sky rotate counter-clockwise throughout the night, as opposed to a person standing at the South Pole, looking up into the sky, seeing the stars rotating clockwise as the night progresses.

A time piece such as a wristwatch will be needed for calculation of longitude with the wheels (10) of the longitude slide ruler of the present invention, as well as for some of the latitude determinations. Preferably a time piece set at Greenwich Mean Time (GMT or Universal coordinated time (UTC). otherwise the time should be converted to GMT before use with the time wheel (90) of the present invention. For longitude measurements a double-sided inclinometer or protractor fitted with a level bubble is preferably used. For latitude, measurements can easily be determined with a sextant, inclinometer or an Astrolabe, measuring the altitude of a star during transit or at the altitude of Polaris with its correction applied using the Polaris correction wheel (140)

There are many methods of use of the present invention. The easiest and most straight forward methods, as well as the criteria to choose them, are preferably as follows.

A.) Northern Hemisphere Longitude Method #1:

For the Northern Hemisphere, the angle of the North Star Polaris to Pherkad is the default pair. Determined via a visual estimate or for precision use bubble leveled protractor or inclinometer. This method is the simplest and strait forward and is used when visibility is good for Polaris and Pherkad. See FIG. 2 flow chart for specific operation.

B.) Northern Hemisphere Longitude Method #2:

This method is similar to method 1 and is utilized when Polaris is visible but the default star Pherkad is not. Choose any star that the navigator can find visible in the sky nearest to Polaris that he or she can identify on the circumpolar star plate. (When choosing a star other than the default star Pherkad, always choose a highly visible star closest to Polaris.)

C.) Northern Hemisphere Longitude Method #3:

This method is similar to method 2 and is utilized when Polaris is not visible. There are a number of Special star balanced pairs that work out very well because each of these pairs have a star on each side of the celestial pole and are very close to 180 degrees rotated from each other and a straight line between them bisect the celestial pole. So in this case there is no need for Polaris residing in the center of the circumpolar region of the sky to measure off of. We are simply looking past the center to the star residing opposite of the target star, and measuring that angle which would have been the same if Polaris were visible and used. These are referred to as Special Balanced pairs. There are number of pairs with decreasing usability based on a number of factors. The combinations are listed in the manual.

D.) Northern Hemisphere Longitude Method #4:

This method is called the East to West Transit method and uses the highest altitude a star reaches as it rounds the celestial North Pole. This method is very unique yet not unique. This method will determine both Longitude and latitude and the direction of true North and can tell the user his or her true local time.

Now looking back, there is a way in standard celestial navigation to use the Sun to achieve a longitude and a latitude fix called the "NOON SHOT". This is actually preferred by mariners because it is the simplest and easiest way to get a location fix. But it can only be done once a day at noon local time. It almost feels like cheating. So out of convenience this method is used more often than any other method. This consists of taking a sequence of measurements one after the other of the altitude and exact GMT/UTC of each measurement starting sometime before your local noon time. Notice the sun increasing then decreasing in altitude as local noon time nears and then passes. Note when the Sun reached its highest point in the sky from your notes and the time it was taken.(this happens to be true South). Now enter into the maze of tables in the government publications and you will eventually find that there is a table which interprets the altitude of the Sun on a specific date then converts this to present observed Latitude and another set of tables which converts the time the sun peaked in altitude in the sky. The difference or error in your observed peak time and the time it would have peaked along the 0° meridian (Prime meridian) is converted to longitude. Thus the Noon shot.

This was explained because the same thing can be done with stars because of the diurnal motion of the stars in the circumpolar region of the sky except much easier than the noon shot. The stars rotate in a big circle counter-clockwise in the Northern hemisphere and each star will peak in altitude as it rotated around the north celestial pole at a specific time which can be interpreted into latitude and longitude respectively. No tables in the government publication or calculations need to be used. What is unique here is that the logic of the "NOON SHOT" is done with a single star. You can use any of the stars visible in the sky that is present on the circumpolar star field plate. This case is used when Polaris or any of the "SPECIAL BALANCE PAIR" Stars in stellar navigation are not visible in part or whole in the sky. A single star is all that is needed when this method. See FIG. 2 flow chart for specific operation.

E.) Northern Hemisphere Longitude Method #5:

Method #5 is called the West-to-East Transit method, and uses the lowest altitude a star reaches as it rounds the celestial North Pole. This method is similar to method #4, but is partially inversed.

The stars rotate in a large circle counter-clockwise in the Northern hemisphere and each star will reach its lowest altitude as it rotated around the north celestial pole from west to east at a specific time which can be interpreted into latitude and longitude respectively. No tables in the government publication or calculations need to be used. What is unique here is that the logic of the "NOON SHOT" is done with a single star. You can use any of the stars visible in the sky that is present on the circumpolar star field plate. This case is used when Polaris or any of the "SPECIAL BALANCE PAIR" Stars are not visible in part or whole in sky. A single star is all that is needed when using this method. See FIG. 2 flow chart for specific operation.

For Latitude, Measure Altitude of the East-to-West Transit Star:

AL1−90+AL2=Latitude.

AL1=altitude listed on the star transit information wheel (20).

AL2=altitude measured of target star during East to West transit

For Latitude Measure the Altitude of the West-to-East Transit Star.

AL2+90−AL1=Latitude

AL1=altitude listed on the star transit information wheel (20).

AL2=altitude measured of target star during West-to-East-transit.

It should be noted that the Northern Hemisphere version of the present invention can determine latitude utilizing three separate methods: via Star Transit Altitude East to West, West to East and Pole star altitude angle above the horizon (using the Polaris star correction wheel (140) for greater precision). Follow formulas for these calculations are listed above.

Similarly, the Southern hemisphere version of the present invention can determine latitude utilizing two separate methods: Star Transit Altitude East-to-West and West-to-East. Users are instructed to follow the formulas listed above for data.

The circumpolar region of the sky is useful to use with the system and method of the present invention as the observer can easily see all the stars needed to determine longitude all within the observers view without turning his or her head, just like looking at a clock face. This is the basis of operation for stellar navigation and the Emergency Longitude Slide ruler of the present invention.

The circumpolar region's diameter in the sky changes based on the differing latitudes in which the observer is located. All the heavenly bodies rotate around the axis poles constantly and consistently. The circumpolar area of the sky is defined as the part of the sky where all the heavenly bodies make a full rotation around the axis pole in a 24-hour period without setting below the present horizon. A time lapse photo taken over a multi-day period would reveal perfect circles which are paths of the stars around the axis pole. This motion is called the diurnal motion. The center of these circles never change throughout the day, week, month, year so on and so forth from a given location.

If the observer is located in the Northern Hemisphere in San Diego, his or her latitude would be approximately 33 degrees north. This indicates that the circumpolar region of the sky is a 66 degree arc diameter. Since the Earth makes approximately one revolution about its axis every 24 hours, to the observer on the surface of the Earth, the stars appear to travel in a perfect circle in the sky centered at the axis pole. This makes it quite convenient to easily look into this region of the sky, and observe the stars rotating in a circle throughout the night. This is also quite convenient as the sky can then easily be converted into a giant 24-hour clock on the sky. For those who are aware, they can look into the night sky and tell the time, longitude and the date merely by eye-balling the rotational position of the stars. Using a protractor device will further increase the accuracy as long as one knows what star positions correlate to what times and date. The Emergency Longitude slide ruler of the present invention does all this for the user, because it can be used to determine the time, as well as the local longitude and date.

One convenient feature of the present invention is that there is no need to know the stars names, unlike the process of use of conventional celestial navigation. Without knowledge required to identify a star's name, a navigator is "dead in the water" with celestial navigation alone. Stellar Navigation can be done using any star displayed in the circumpolar star field plate (30) simply by measuring any prominent star and matching that star in the circumpolar star field plate (30) on the emergency longitude ruler.

In summation, the Stellar Navigation method of the present invention is the heart of the present invention, allowing the use of the Emergency Longitude Slide Ruler of the present invention to be possible. The method allows all pertinent information to determine longitude to be contained in a physical, hand-held, manually-operated, circular, tubular or strait slide-rule format. All pertinent information being contained in the series of wheels (10) which line up against one other in specific ways based on current date, time, and the observed circumpolar region of the sky. No other items are needed to use the system of the present invention except in the case of precision navigation where an angle measuring device, such as a double sided inclinometer or a protractor with a level and a movable angle arm along with a watch set at GMT of UTC as it is now called. A sextant or astrolabe can be used for Latitude measurements. For convenience an astrolabe is fitted on the reverse side of the Emergency Longitude Slide Ruler.

It should be noted that the Emergency Longitude slide ruler of the present invention is not intended to replace celestial navigation. Celestial navigation embodies many methods of finding longitude using the Sun, Moon and planets as well as the stars, stellar navigation and the Emergency Longitude Slide Ruler offers an alternative to the standard taught star method and uses only the stars. This simplistic approach will allow an amateur, without the use of electronics or education in Celestial Navigation and its required government publications of tables, to determine his exact location on earth quickly and accurately in a matter of minutes, even without a sextant. Also, the present invention is designed to aid experienced navigators as they travel over the open seas who still wish to use celestial navigation in close quarters to land, but can quickly and easily plot a course in the open seas with the system of the present invention, or to verify all other forms of celestial and global positioning accuracy with a secondary form of verification as a precaution. The system of the present invention can also determine exact star patterns at any given location, time, date and year future and past.

Figure 2:
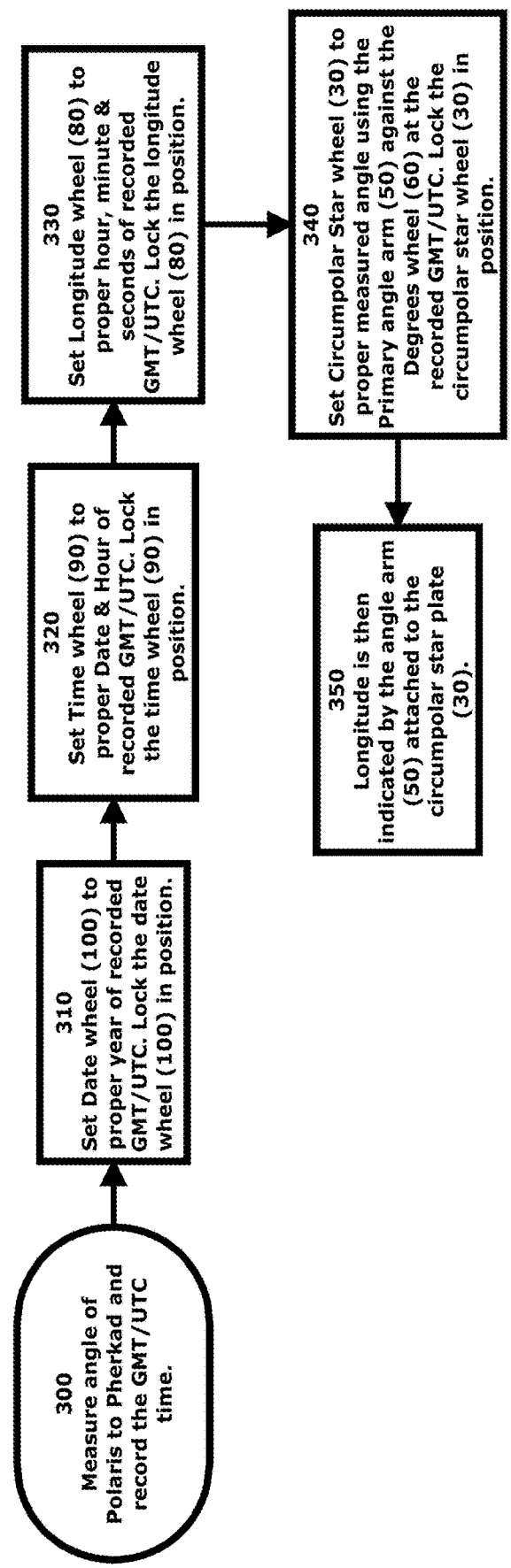
FIG. 2 exhibits a flow chart depicting a first process of use of the present invention.
Figure 3:
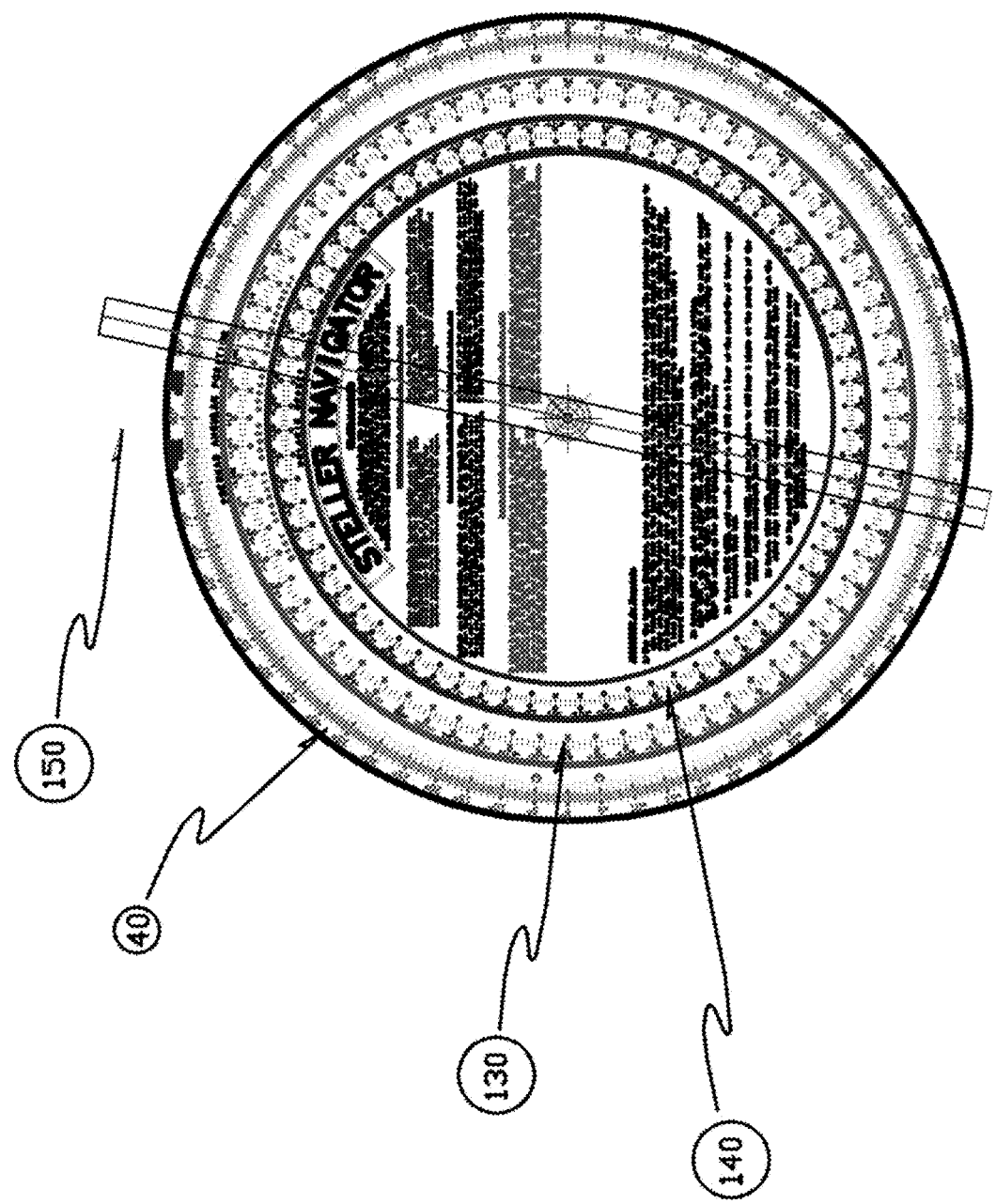
FIG. 3 displays a view of the preferred embodiment of the present invention as seen from the rear.
Figure 4:
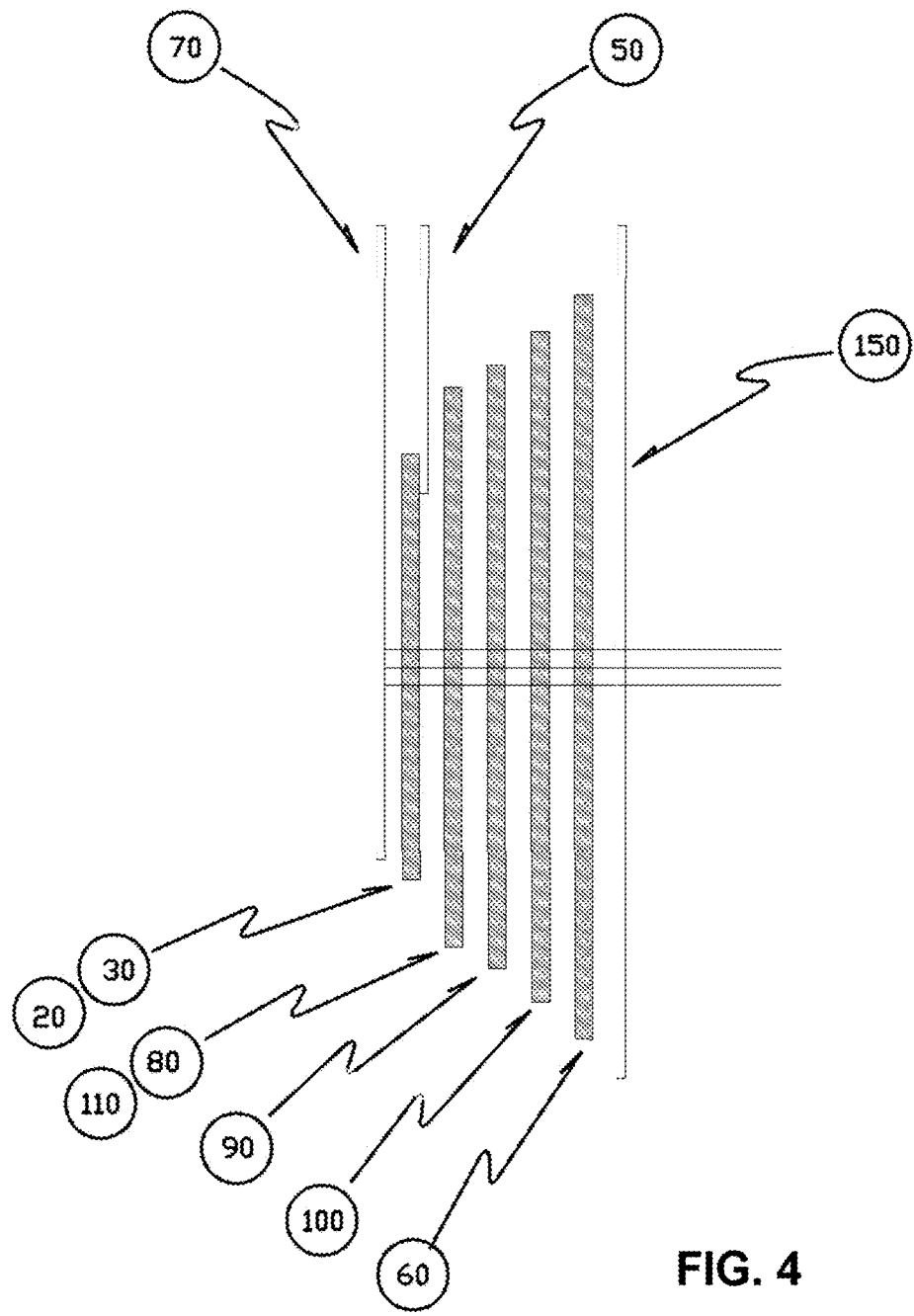
FIG. 4 exhibits a view of the present invention as seen from the side. The thicknesses of some components of the present invention are exaggerated for clarity.

The preferred methods of use for each embodiment of the present invention is preferably as follows:

Abbreviated Operating Steps for Longitude Method #1—as shown in FIG. 2:
  Measure angle of Polaris to Pherkad (default target star) and record the GMT/UTC time. (300)
  Set Date wheel (100) to proper year of recorded GMT/UTC. Lock the date wheel (100) in position. (310)
  Set Time wheel (90) to proper Date and Hour of recorded GMT/UTC. Lock the time wheel (90) in position. (320)
  Set Longitude wheel (80) to proper hour, minute and seconds of recorded GMT/UTC. Lock the longitude wheel (80) in position. (330)
  Set Circumpolar Star wheel (30) to proper measured angle using the Primary angle arm (50) against the Degrees wheel (60) at the recorded GMT/UTC. Lock the circumpolar star wheel (30) in position. (340)
  Longitude is then indicated by the angle arm (50) attached to the circumpolar star plate (30). (350)

Figure 5:
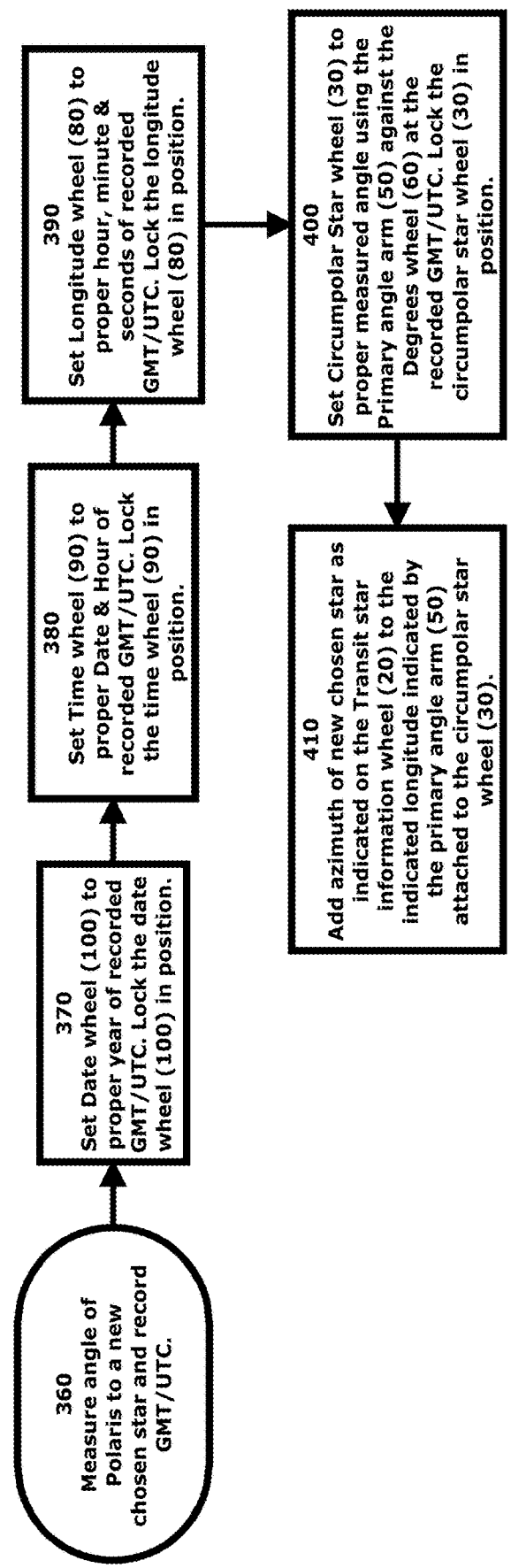
FIG. 5 exhibits a flow chart depicting a second method of use of the present invention.

Abbreviated Operating Steps for Longitude Method #2—as shown in FIG. 5:
  Measure angle of Polaris to a new chosen target star and record GMT/UTC. (360)
  Set Date wheel (100) to proper year of recorded GMT/UTC. Lock the date wheel (100) in position. (370)
  Set Time wheel (90) to proper Date and Hour of recorded GMT/UTC. Lock the time wheel (90) in position. (380)
  Set Longitude wheel (80) to proper hour, minute and seconds of recorded GMT/UTC. Lock the longitude wheel (80) in position. (390)
  Set Circumpolar Star wheel (30) to proper measured angle using the Primary angle arm (50) against the Degrees wheel (60) at the recorded GMT/UTC. Lock the circumpolar star wheel (30) in position. (400)
  Add azimuth of new chosen star as indicated on the Transit star information wheel (20) to the indicated longitude indicated by the primary angle arm (50) attached to the circumpolar star wheel (30). (410)

Figure 6:
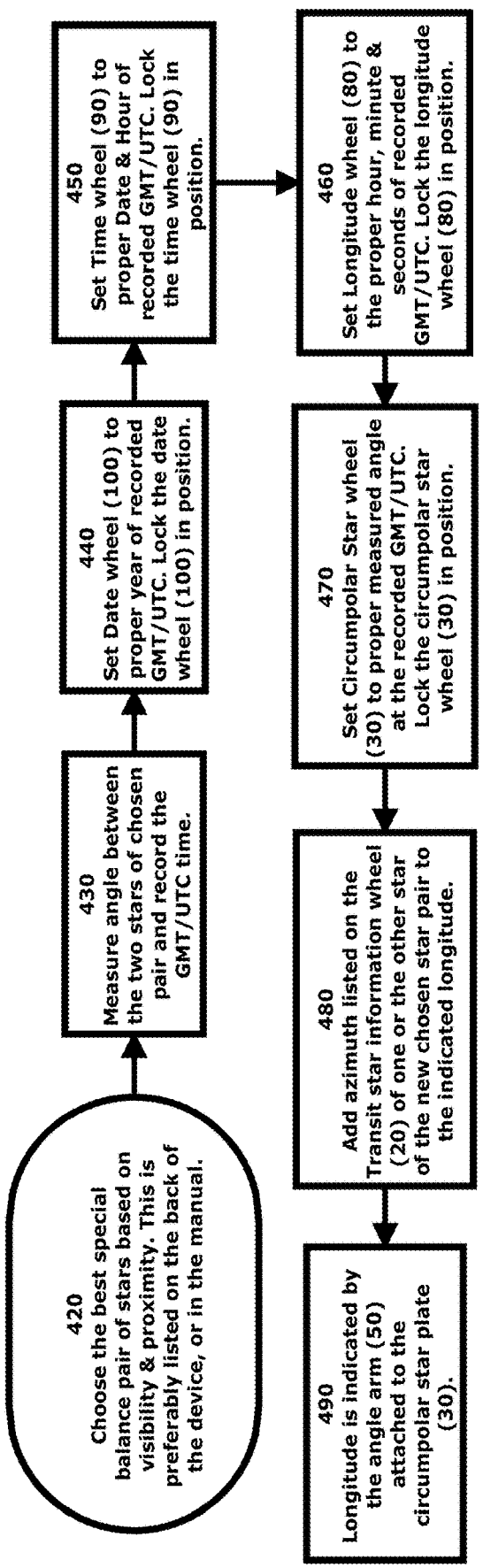
FIG. 6 is a flow chart detailing a third method of use of the present invention.

Abbreviated Operating Steps for Longitude Method #3—as shown in FIG. 6:
  Choose the best special balance pair of stars based on visibility and proximity. This is preferably listed on the back of the device, or in the manual. (420)
  Measure angle between the two stars of chosen pair and record the GMT/UTC time. (430)
  Set Date wheel (100) to proper year of recorded GMT/UTC. Lock the date wheel (100) in position. (440)
  Set Time wheel (90) to proper Date and Hour of recorded GMT/UTC. Lock the time wheel (90) in position. (450)
  Set Longitude wheel (80) to the proper hour, minute and seconds of recorded GMT/UTC.
  Lock the longitude wheel (80) in position. (460)
  Set Circumpolar Star wheel (30) to proper measured angle at the recorded GMT/UTC. Lock the circumpolar star wheel (30) in position. (470)
  Add azimuth listed on the Transit star information wheel (20) of one or the other target star of the new chosen star pair to the indicated longitude. (480)
  Longitude is indicated by the angle arm (50) attached to the circumpolar star plate (30). (490)

Figure 7:
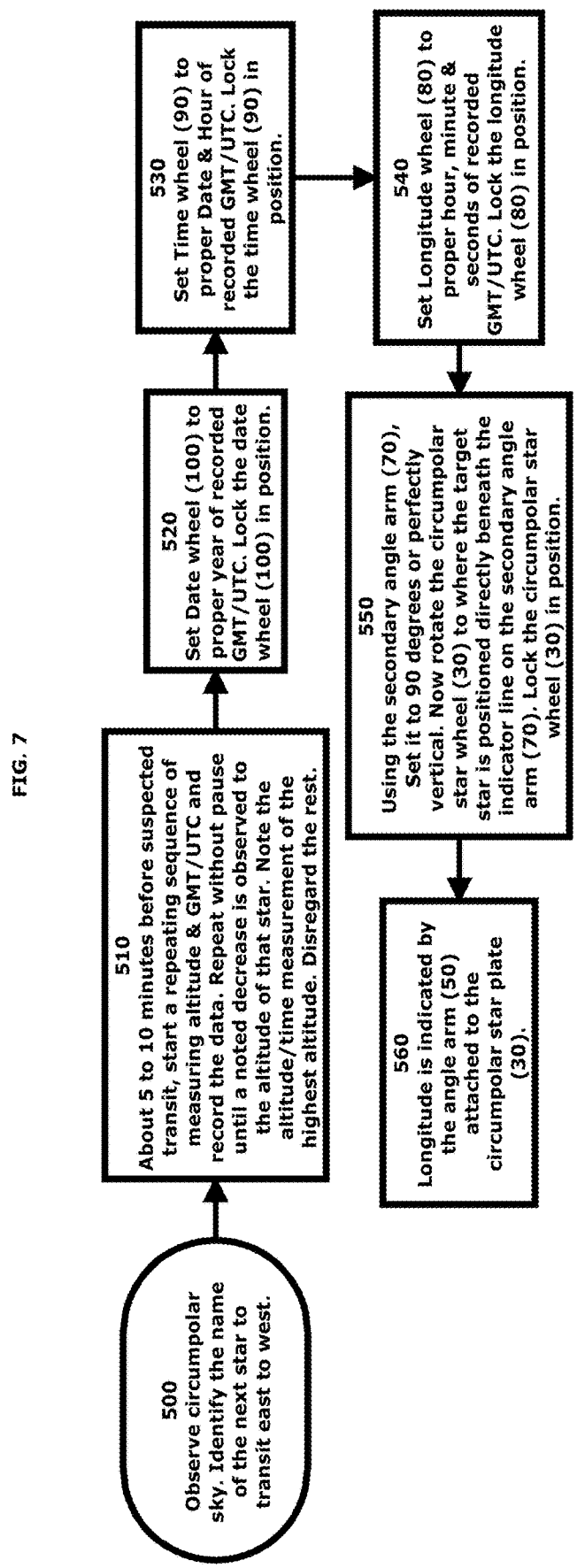
FIG. 7 is a flow chart depicting a fourth method of use of the present invention.

Abbreviated Operating Steps for Longitude Method #4—as shown in FIG. 7:

Observe circumpolar sky. Identify the name of the next star to transit east to west. (500)

About 5 to 10 minutes before suspected transit, start a repeating sequence of measuring altitude and GMT/UTC and record the data. Repeat without pause until a noted decrease is observed to the altitude of that star. Note the altitude/time measurement of the highest altitude. Disregard the rest. (510)

Set Date wheel (100) to proper year of recorded GMT/UTC. Lock the date wheel (100) in position. (520)

Set Time wheel (90) to proper Date and Hour of recorded GMT/UTC. Lock the time wheel (90) in position. (530)

Set Longitude wheel (80) to proper hour, minute and seconds of recorded GMT/UTC. Lock the longitude wheel (80) in position. (540)

Using the secondary angle arm (70), Set it to 90 degrees or perfectly vertical. Now rotate the circumpolar star wheel (30) to where the target star is positioned directly beneath the indicator line on the secondary angle arm (70). Lock the circumpolar star wheel (30) in position. (550)

Longitude is indicated by the angle arm (50) attached to the circumpolar star plate (30). (560)

Figure 8:
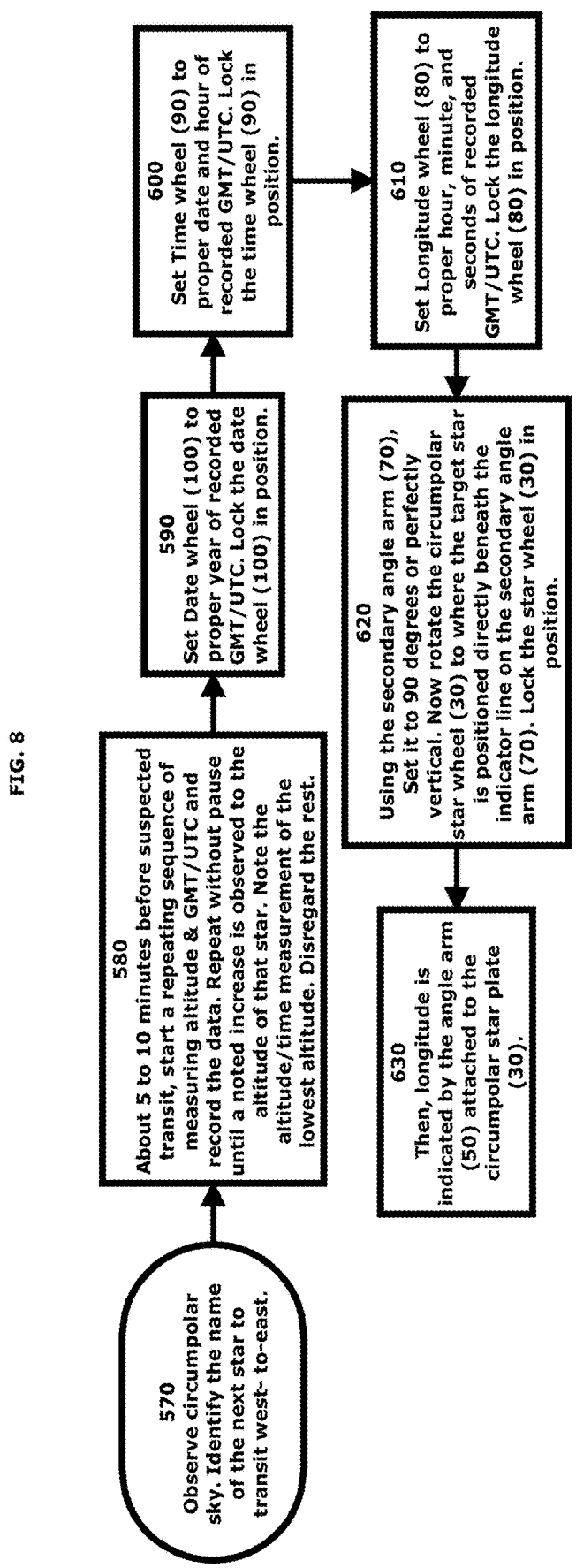
FIG. 8 is a flow chart depicting a fifth method of use of the present invention.

Abbreviated Operating Steps for Longitude Method #5—as shown in FIG. 8:

Observe circumpolar sky. Identify the name of the next star to transit west-to-east. (570)

About 5 to 10 minutes before suspected transit, start a repeating sequence of measuring altitude and GMT/UTC and record the data. Repeat without pause until a noted increase is observed to the altitude of that star. Note the altitude/time measurement of the lowest altitude. Disregard the rest. (580)

Set Date wheel (100) to proper year of recorded GMT/UTC. Lock the date wheel (100) in position. (590)

Set Time wheel (90) to proper date and hour of recorded GMT/UTC. Lock the time wheel (90) in position. (600)

Set Longitude wheel (80) to proper hour, minute and seconds of recorded GMT/UTC. Lock the longitude wheel (80) in position. (610)

Using the secondary angle arm (70), Set it to 90 degrees or perfectly vertical. Now rotate the circumpolar star wheel (30) to where the target star is positioned directly beneath the indicator line on the secondary angle arm (70). Lock the star wheel (30) in position. (620)

Then, longitude is indicated by the angle arm (50) attached to the circumpolar star plate (30). (630)

An additional embodiment of the present invention is a virtual embodiment of the emergency longitude slide ruler displayed and used on a mobile device including but not limited to a smartphone, PDA, computer, smart watch, or other similar internet-connected device. It should be noted that the electronic, virtual embodiment of the present invention does not require the internet nor GPS to function for navigation. This virtual embodiment of the present invention may employ a prior or 'last' signal of the onboard GPS of the mobile device to attain precise star data based on the location of the user to facilitate a rapid fix on location. The user of this prior signal is not mandatory, as the data may be ascertained via time data and measured star angles. The wheels (10) of the virtual embodiment of the present invention are set automatically based on GMT/UTC time data from the mobile device, and are displayed virtually on the display screen of the mobile device.

Conventionally, such mobile devices such as smartphones are equipped with a camera. In order to assess the angle for virtual form of the secondary angle arm (70), users are preferably provided the option to direct the camera of the mobile device to the sky at the target star. A picture is then taken, facilitating the approximation of the requisite angle of the target star for navigation. The picture can be compared by the processor of the mobile device to internal star data attained during the last time the mobile device was connected to the internet. In the event that the user's mobile device is not equipped with an onboard camera, or that the user does not wish to use the camera, the user may select 'manual input,' which provides the user with blank fields in which the star angle can be entered. However, it is envisioned that the camera be the preferred method of attaining the star angle rapidly.

It should be understood that this virtual embodiment of the present invention is preferably available on mobile devices as an 'app' or application, potentially made available via the Google™ Play Store™ and/or the Apple™ App Store™. Additionally, the virtual embodiment of the present invention is configured to be executed in conventional programming languages executed on conventional mobile operating systems, including Windows Mobile™, Apple™iOS™, and Google™ Android™.

Additionally, it is envisioned that the present invention may be applicable to the guidance of remotely controlled devices, including drones. In such applications, an accurate fix on position is critical for the success of the device. The method of the present invention may be applied to such instances, with the remotely controlled device acting as the third point to obtain a fix.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method for obtaining a longitude fix on location comprising:
   measuring the angle between two known stars;
   recording the time;
   setting a date wheel of a star wheel to the year of the recorded time;
   setting a time wheel of the star wheel to the date and hour of the recorded time;
   setting a longitude wheel of the star wheel to the hour, minute, and seconds of the recorded time;
   setting a circumpolar star wheel to the measured angle using a primary angle arm against a degrees wheel set to the recorded time; and the primary angle arm indicating a local longitude when positioned according to measured angle.

2. A method for determining local longitude based on stellar navigation comprising:

measuring an angle between Polaris and a chosen target start;

recording the time;

setting a date wheel of a star wheel to the year of the recorded time;

setting a time wheel of the star wheel to the date and hour of the recorded time;

setting a longitude wheel of the star wheel to the hour, minute, and seconds of the recorded time;

setting a circumpolar star wheel to the measure angled using a primary angle arm against a degrees wheel at the recorded time; and adding an azimuth of the chosen star as indicated on a transit star information wheel to a longitude value indicated by the primary angle arm in communication with the circumpolar star wheel.

3. An emergency longitude slide ruler apparatus comprising:

a circumpolar star wheel;

a time wheel;

a date wheel;

wherein said date wheel is demarcated with gradations;

a degrees wheel;

a longitude wheel;

a time piece;

a time zone wheel;

a circumpolar star field plate;

wherein said circumpolar star field plate includes stars usable for obtaining a fix on longitude;

a star meridian transit angle wheel; and an angle arm.

\* \* \* \* \*